(12) United States Patent
Yoon et al.

(10) Patent No.: US 10,308,294 B2
(45) Date of Patent: Jun. 4, 2019

(54) VARIABLE AERODYNAMIC SYSTEM FOR VEHICLE

(71) Applicants: Hyundai Motor Company, Seoul (KR); Kia Motors Corporation, Seoul (KR)

(72) Inventors: Jin Young Yoon, Gimpo-si (KR); Hyun Gyung Kim, Hwaseong-si (KR); Keon Soo Jin, Ulsan (KR); Ki Hong Lee, Seoul (KR); Dong Eun Cha, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/614,357

(22) Filed: Jun. 5, 2017

(65) Prior Publication Data

US 2018/0134331 A1    May 17, 2018

(30) Foreign Application Priority Data

Nov. 16, 2016    (KR) .......................... 10-2016-0152935

(51) Int. Cl.
*B62D 35/00*    (2006.01)
*B62D 35/02*    (2006.01)
*B62D 37/02*    (2006.01)

(52) U.S. Cl.
CPC .......... *B62D 35/007* (2013.01); *B62D 35/005* (2013.01); *B62D 37/02* (2013.01); *B62D 35/02* (2013.01); *Y02T 10/82* (2013.01); *Y02T 10/88* (2013.01)

(58) Field of Classification Search
CPC .... B62D 35/00; B62D 35/005; B62D 35/007; B62D 35/02; B62D 37/02
USPC ...................... 296/180.5, 37.2, 37.14; 701/49
See application file for complete search history.

(56) References Cited

U.S. PATENT DOCUMENTS

| | | | | |
|---|---|---|---|---|
| 8,102,600 | B2 * | 1/2012 | Shyu ..................... | G02B 3/0037 |
| | | | | 359/621 |
| 8,579,167 | B2 * | 11/2013 | Yamada ................. | B62D 43/04 |
| | | | | 224/42.12 |
| 8,882,176 | B2 | 11/2014 | Froling et al. | |
| 9,517,802 | B1 * | 12/2016 | Froling ................ | B62D 35/005 |
| 9,828,044 | B2 * | 11/2017 | Heil ..................... | B62D 35/005 |
| 9,849,924 | B2 * | 12/2017 | Shami ................... | B62D 35/005 |
| 9,902,438 | B2 * | 2/2018 | Bray ..................... | B62D 35/007 |

(Continued)

FOREIGN PATENT DOCUMENTS

JP      H8005111 Y2    2/1996
KR    19950008181 B1    5/1997

(Continued)

*Primary Examiner* — Gregory A Blankenship
(74) *Attorney, Agent, or Firm* — Slater Matsil, LLP

(57) ABSTRACT

The present invention provides a variable aerodynamic system for a vehicle. The system includes an active air skirt, an active rear spoiler, and an active rear bumper spoiler of which one or more are selected and deployed by a controller, while a vehicle is running, when the controller receives information obtained by a detector, and determines that the obtained information satisfies conditions inputted in advance by comparing the obtained information with the conditions inputted in advance. The height from an end of a front bumper to a front wheel center is within a predetermined value.

17 Claims, 5 Drawing Sheets

(56) References Cited

U.S. PATENT DOCUMENTS

| | | | | |
|---|---|---|---|---|
| 2004/0130182 | A1* | 7/2004 | Bangle | B32B 5/24 |
| | | | | 296/180.5 |
| 2007/0145776 | A1* | 6/2007 | Grave | B62D 35/007 |
| | | | | 296/180.5 |
| 2011/0148141 | A1* | 6/2011 | Pfertner | B60J 7/043 |
| | | | | 296/180.3 |
| 2013/0226414 | A1* | 8/2013 | De Luca | B62D 37/02 |
| | | | | 701/49 |
| 2016/0159412 | A1* | 6/2016 | Oxley | B62D 35/007 |
| | | | | 296/180.5 |
| 2017/0043644 | A1* | 2/2017 | Mosher | B60G 99/006 |
| 2017/0080770 | A1* | 3/2017 | Irwin | B60G 17/0165 |
| 2017/0080987 | A1* | 3/2017 | Morgan | B62D 37/02 |
| 2017/0088192 | A1* | 3/2017 | Auden | B62D 35/00 |
| 2017/0088200 | A1* | 3/2017 | Heil | B62D 35/005 |
| 2017/0092022 | A1* | 3/2017 | Heil | B62D 35/005 |
| 2017/0151984 | A1* | 6/2017 | Bray | B62D 35/007 |
| 2017/0158257 | A1* | 6/2017 | Fahland | B62D 35/005 |
| 2017/0158262 | A1* | 6/2017 | Shami | B62D 35/005 |
| 2018/0079295 | A1* | 3/2018 | Woo | B62D 35/005 |
| 2018/0111650 | A1* | 4/2018 | Swantick | B62D 35/005 |
| 2018/0134331 | A1* | 5/2018 | Yoon | B62D 35/005 |

FOREIGN PATENT DOCUMENTS

| | | |
|---|---|---|
| KR | 20160031320 A | 3/2016 |
| KR | 20160043320 A | 4/2016 |

\* cited by examiner

VARIABLE AERODYNAMIC SYSTEM FOR VEHICLE

CROSS-REFERENCE TO RELATED APPLICATIONS

The present application claims priority to Korean Patent Application No. 10-2016-0152935, filed Nov. 16, 2016, the entire content of which is incorporated herein for all purposes by this reference.

TECHNICAL FIELD

The present invention relates to vehicles, and in particular to a variable aerodynamic system for a vehicle.

BACKGROUND

In general, when a vehicle runs on a road at a high speed, drag that is resistant force proportional to the speed, and the area of the vehicle is generated and lift is generated on the vehicle by the air flowing on the car body, so the vehicle is lifted.

The top of a vehicle is curved and the bottom is flat. Accordingly, the speed of the air flowing over the top of the vehicle is greater than the speed of the air flowing under the bottom, so a pressure difference is generated between the top and the bottom of the vehicle, so lift is applied to the vehicle.

In order to solve this problem, in the related art, a rear spoiler is installed on a roof panel or a tailgate of a van or a sports utility vehicle (SUV), or a fixed-type spoiler is mounted on a trunk lid of a general vehicle, thereby preventing the rear portion of the vehicle from being lifted by lift when the vehicle runs at high speed. The fixed-type spoiler increases stability and braking ability when a vehicle runs by offsetting lift, but it increases the resistance of air flowing around the vehicle when the vehicle runs at a low speed, so drivability is deteriorated.

Accordingly, active aerodynamic systems that overcome package limits and are stowed and deployed, depending on the vehicle speed, have been developed. Representatively, there are an active air skirt (AAA) that is disposed behind the front bumper of a vehicle, an active rear spoiler (ARS) that is disposed on the trunk lid, the roof panel, or the tailgate of a vehicle, and an active rear bumper spoiler that is disposed under the rear bumper of a vehicle. However, these devices are being developed and applied as separate (independent) systems, but the relationships between the systems, the optimum shapes of the three combinations, and the optimum logics have not been sufficiently studied.

The description provided above as a related art of the present invention is just for helping understanding the background of the present invention and should not be construed as being included in the related art known by those skilled in the art.

SUMMARY

The present invention has been made in an effort to solve the problems, and an object of the present invention is to provide a variable aerodynamic system for a vehicle, the system performing overall control of aerodynamic devices in the vehicle.

In order to achieve the objects of the present invention, a variable aerodynamic system for a vehicle according to an aspect of the present invention includes an active air skirt, an active rear spoiler, and an active rear bumper spoiler of which one or more are selected and deployed by a controller when the controller receives information obtained by a detector while a vehicle, in which the height from an end of a front bumper to a front wheel center is within a predetermined value, runs, and determines that the obtained information satisfies conditions inputted in advance by comparing the obtained information with the conditions inputted in advance.

A speed table including a normal mode, a fuel-efficient mode, and a driving mode divided in accordance with a speed of a vehicle may be inputted in the controller, and the controller may check to which a current speed inputted by the detector corresponds, and select and deploy one or more of the active air skirt, the active rear spoiler, and the active rear bumper spoiler in accordance with the mode to which the current speed of the vehicle corresponds.

When the vehicle is a sedan and the speed of the vehicle is within a first range inputted in advance in the controller, the controller may determine that it is the normal mode and may not deploy the active air skirt, the active rear spoiler, and the active rear bumper spoiler.

When the vehicle is a sedan and the speed of the vehicle is within a second range inputted in advance in the controller, the controller may determine that it is the fuel-efficient mode and may deploy the active air skirt, the active rear spoiler, and the active rear bumper spoiler to an extent corresponding to a first reference value inputted in advance in the controller.

When the vehicle is a sedan and the speed of the vehicle is within the third range inputted in advance in the controller, the controller may determine that it is the driving mode and may deploy the active air skirt, the active rear spoiler, and the active rear bumper spoiler to an extent corresponding to a second reference value inputted in advance in the controller.

When the vehicle is an SUV and the speed of the vehicle is within the first range inputted in advance in the controller, the controller may determine that it is the normal mode and does not deploy the active air skirt and the active rear spoiler.

When the vehicle is an SUV and the speed of the vehicle is within the second range inputted in advance in the controller, the controller may determine that it is the fuel-efficient mode and may deploy the active air skirt to an extent corresponding to a third reference value inputted in advance in the controller.

When the vehicle is an SUV and the speed of the vehicle is within the third range inputted in advance in the controller, the controller may determine that it is the driving mode and may deploy the active air skirt and the active rear spoiler as much as a fourth reference value inputted in advance in the controller.

The controller may have a first hysteresis period for stowing devices that have been deployed of the active air skirt, the active rear spoiler, and the active rear bumper spoiler at a speed lower than a speed when a second range was started, when the speed of the vehicle decreases from the second range inputted in the controller to a first range.

The controller may have a second hysteresis period for stowing devices that have been deployed of the active air skirt, the active rear spoiler, and the active rear bumper spoiler at a speed lower than a speed when the third range was started, when the speed of the vehicle decreases from the third range inputted in the controller to a second range.

The height from an end a rear bumper to a rear wheel center of a vehicle may be within a predetermined reference value.

The system may be applied, when the vehicle is an SUV and a spare tire is attached to the bottom of a rear floor.

In a variable aerodynamic system for a vehicle according to another aspect of the present invention, a speed table including a normal mode, a fuel-efficient mode, and a driving mode divided in accordance with a speed of a vehicle is inputted in a controller, and the system includes an active air skirt and an active rear spoiler that are deployed by a controller in accordance with a reference value corresponding to a mode in which a current speed of the vehicle is included, after the controller receives information obtained by a detector and checks a mode in the speed table in the controller to which the speed of the vehicle corresponds, while a sedan, in which a height from an end of a front bumper to a front wheel center is within a predetermined value, runs.

In a variable aerodynamic system for a vehicle according to another aspect of the present invention, a speed table including a normal mode, a fuel-efficient mode, and a driving mode divided in accordance with basic information and a speed of a vehicle is inputted in a controller, and the system includes an active air skirt and an active rear spoiler that are deployed by a controller in accordance with a reference value corresponding to a fuel-efficient mode, when the controller receives information about the vehicle obtained by a detector and a speed of the vehicle corresponds to the fuel-efficient mode in the speed table in the controller, while a vehicle, in which a height from an end of a front bumper to a front wheel center is within a predetermined value, runs.

According to the variable aerodynamic system for a vehicle, having the structure described above, when the active air skirt, the active rear spoiler, and the active rear bumper spoiler are mounted on a vehicle, one or more of the aerodynamic devices are simultaneously deployed, so it is possible to improve fuel efficiency and secure driving stability by applying the optimum drag coefficient CD or lift coefficient CL to the driving of the vehicle in accordance with the ranges of speed of the vehicle.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

The present invention relates to a variable aerodynamic system and, particularly, to a variable aerodynamic system for a vehicle, the system performing overall control of aerodynamic systems in the vehicle.

A variable aerodynamic system for a vehicle according to an embodiment of the present invention is described hereafter with reference to the accompanying drawings.

Figure 1:
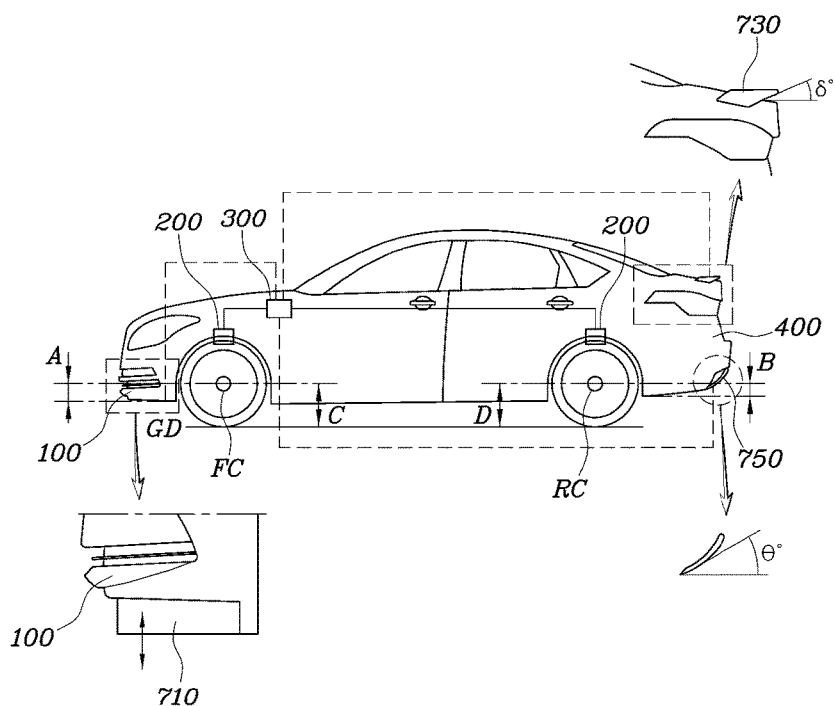
FIGS. 1 and 2 are views each showing a sedan and an SUV that are equipped with a variable aerodynamic system for a vehicle according to an embodiment of the present invention.
Figure 2:
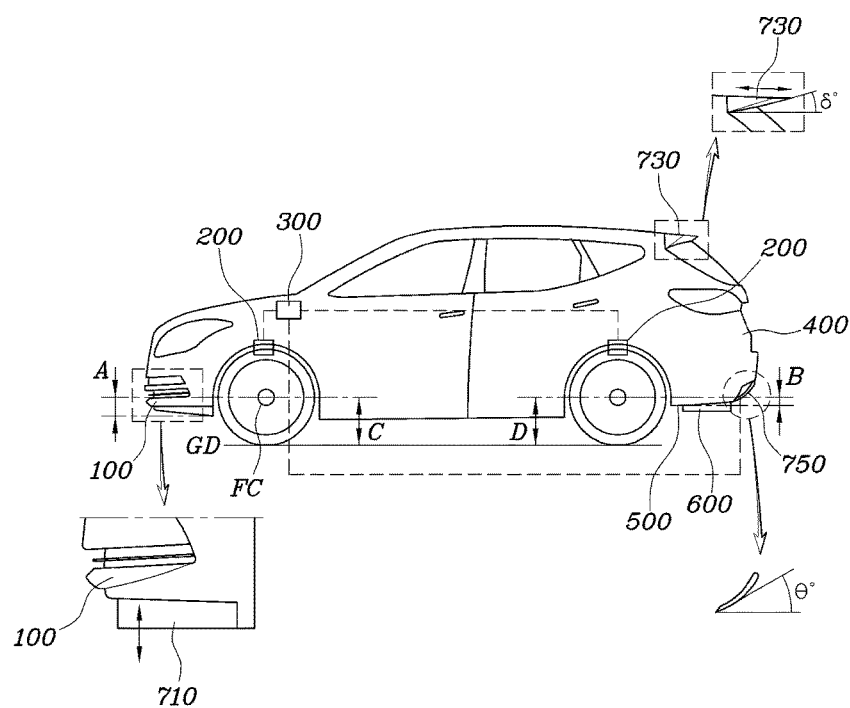
Figure 3:
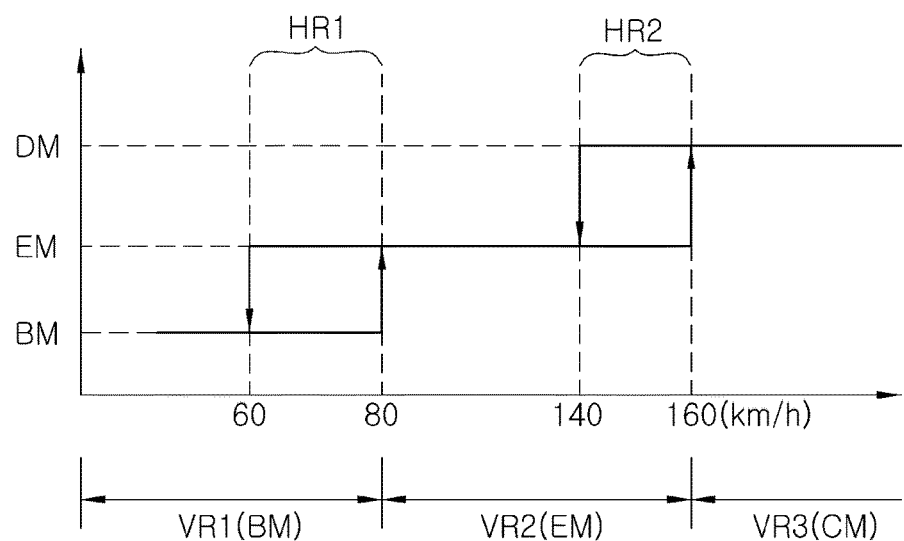
FIG. 3 is a graph showing a control period depending on a vehicle speed of the variable aerodynamic system for a vehicle according to an embodiment of the present invention.
Figure 4:
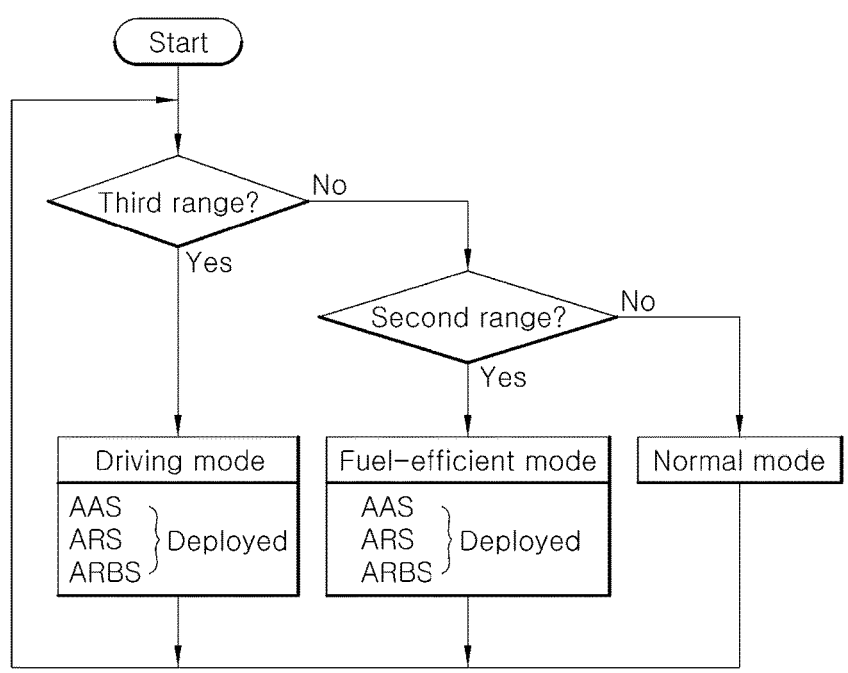
FIGS. 4 and 5 are flowcharts briefly illustrating control of the present invention.
Figure 5:
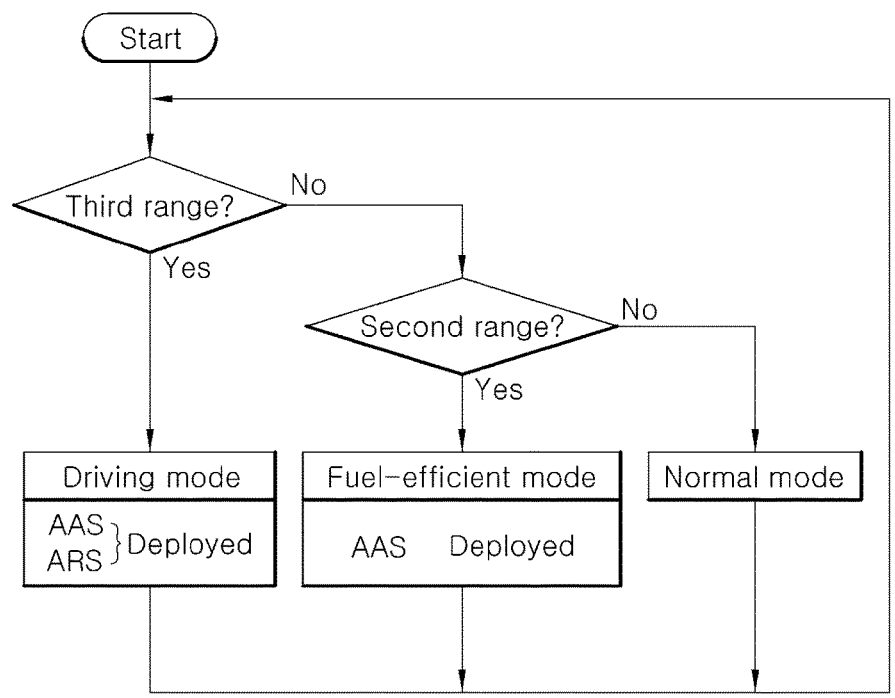

FIGS. 1 and 2 are views each showing a sedan and an SUV that are equipped with a variable aerodynamic system for a vehicle according to an embodiment of the present invention and FIG. 3 is a graph showing a control period depending on a vehicle speed of the variable aerodynamic system for a vehicle according to an embodiment of the present invention. Further, FIGS. 4 and 5 are flowcharts briefly illustrating control of the present invention.

As shown in FIGS. 1 and 2, a variable aerodynamic system for a vehicle according to an embodiment of the present invention can be used for both sedans and SUVs. In particular, the system can be used for sedans, when any one of the cases in which the height A from the end of a front bumper 100 to a front wheel center FC, excluding a bumper lip, is 0~200 mm, the height B from the end of a rear bumper 400 to a rear wheel center RC is −100~200 mm, the height C of the front wheel center FC from the ground GD is 200~400 mm, and the height D of the rear wheel center RC from the ground GD is 150~500 mm is satisfied. Further, the system can be used for SUVs only when a spare tire 600 is attached to the bottom of a rear floor 500 of the vehicles, including the conditions for sedans.

The variable aerodynamic system for a vehicle according to an embodiment of the present invention includes an active air skirt 710, an active rear spoiler 730, and an active rear bumper spoiler 750 of which one or more are selected and deployed by a controller 300 when the controller 300 receives information obtained by a detector 200 while a vehicle in which the height from an end of the front bumper 100 to the front wheel center FC is within a predetermined value runs, and determines that the obtained information satisfies conditions inputted in advance by comparing the obtained information with the conditions inputted in advance. The detector may be a vehicle speed sensor for detecting the speed of a vehicle. Further, the controller 300 can perform control in different ways, depending on whether the vehicle is a sedan or an SUV, control logic for the type of vehicle is inputted in advance in the controller 300 when the vehicle is manufactured, and sedans and SUVs are controlled in accordance with the corresponding control logic. The active air skirt 710, the active rear spoiler 730, and the active rear bumper spoiler 750 are well known in the arts, so they are not described in detail herein.

When a vehicle starts to run, the detector 200 detects the speed of the vehicle and the detected information is transmitted to the controller 300. A speed table including a first range VR1, a second range VR2, and a third range VR3 for the speed of a vehicle, and a normal mode BM, a fuel-efficient mode EM, and a driving mode DM, has been inputted in advance in the controller 300. Accordingly, the controller 300 checks the mode in the speed table in the controller 300 that the current transmitted speed corresponds to, and selects one or more of the active air skirt 710, the active rear spoiler 730, and the active rear bumper spoiler 750 in accordance with the corresponding mode and controls an actuator (not shown) to deploy the devices to extents corresponding to the reference values inputted in the controller 300.

First, the case where the vehicle is a sedan is described.

When the vehicle is a sedan and it is determined that the speed of the vehicle is in the first range VR1, inputted in the controller 300, the controller 300 determines that the current driving mode of the vehicle is the normal mode BM and does not deploy the active air skirt 710, the active rear spoiler 730, or the active rear bumper spoiler 750.

Second, when the vehicle is a sedan and it is determined that the speed of the vehicle is in the second range VR2, inputted in the controller 300, the controller 300 determines that the current driving mode of the vehicle is the fuel-efficient mode EM, and controls actuators to an extent corresponding to the first reference value, inputted in the controller 300, to deploy the active air skirt 710, the active rear spoiler 730, and the active rear bumper spoiler 750. Accordingly, in accordance with the first reference value, the active air skirt 710 is deployed 80 mm downward from the vehicle, the active rear spoiler 730 is deployed to an angle δ of 0 degrees from the horizontal line of the vehicle, and the active rear bumper spoiler 750 is deployed to an angle θ of 5 degrees from the horizontal line of the vehicle, and is then deployed downward 100 mm from the vehicle. The trunk lines of vehicles are lower than the horizontal lines of the vehicles in many cases, so the active rear spoiler can be deployed in a range from negative angles to positive angles.

Finally, when the vehicle is a sedan and it is determined that the speed of the vehicle is in the third range VR3, inputted in the controller 300, the controller 300 determines that the current driving mode of the vehicle is the driving mode DM and controls the actuators to deploy the active air skirt 710, the active rear spoiler 730, and the active rear bumper spoiler 750 to an extent corresponding to the second reference value inputted in the controller 300. Accordingly, in accordance with the second reference value, the active air skirt 710 is deployed 20 mm downward from the vehicle, the active rear spoiler 730 is deployed to an angle δ of 12.7 degrees from the horizontal line of the vehicle, and the active rear bumper spoiler 750 is deployed to an angle θ of 5 degrees from the horizontal line of the vehicle, and is then deployed downward 100 mm below the vehicle.

As described above, in order for the controller 300 to deploy (draw out) the different aerodynamic devices in the normal mode BM, the fuel-efficient mode EM, and the driving mode DM to a predetermined extent, drag coefficients CD and lift coefficients CL are calculated in advance for the case where the active air skirt 710, the active rear spoiler 730, and the active rear bumper spoiler 750 are deployed, drag coefficients CD and lift coefficients CL are calculated in advance for combinations of two or more of the active air skirt 710, the active rear spoiler 730, and the active rear bumper spoiler 750, and then optimum conditions are obtained through tests.

Table 1 illustrates optimum conditions for combinations (based on analysis result and large sedan).

| Combination | | Condition for optimum drag | Condition for optimum lift | $\Delta C_D$ (Drag) | $\Delta C_L$ (Lift) |
|---|---|---|---|---|---|
| A | ① AAS | 80 mm | 20 mm | −0.020 | −0.087 |
| B | ② ARS | 0 degrees | 12.7 degrees | −0.003 | −0.069 |
| C | ③ RBAS | 15 degrees, 100 mm | 35 degrees, 100 mm | −0.006 | −0.018 |
| D | ① + ② | ① 80 mm ② 0 degrees | ① 20 mm ② 12.7 degrees | −0.023 | −0.160 |
| E | ① + ③ | ① 80 mm, ③ 15 degrees, 120 mm | ① 20 mm, ③ 15 degrees, 140 mm | −0.022 | −0.104 |
| F | ② + ③ | ② 0 degrees ③ 5 degrees, 100 mm | ② 12.7 degrees ③ 15 degrees, 140 mm | −0.009 | −0.085 |
| G | ① + ② + ③ | ① 80 mm ② 0 degrees ③ 5 degrees, 100 mm | ① 20 mm ② 12.7 degrees ③ 5 degrees, 120 mm | −0.027 | −0.176 |

The table was obtained through tests of optimum conditions for devices based on a large sedan. As can be seen from Table 1, even for drag coefficients CD and lift coefficients of the same devices, different conditions are obtained for each combination.

Table 2 illustrates conditions for optimum drag for systems.

| Conditions for optimum drag for systems | $\Delta C_{D\ combination}$ | $\Delta C_{D\ individual\ sum}$ | $\Delta C_{D\ error}$ |
|---|---|---|---|
| ① 80 mm ② 0 degrees | −0.023 | −0.023 | 0% |
| ① 80 mm, ③ 120 mm, 15 degrees | −0.022 | −0.026 | 15.4% |
| ② 0 degrees, ③ 120 mm, 15 degrees | −0.004 | −0.009 | 55.6% |
| ① 80 mm ② 0 degrees ③ 120 mm, 15 degrees | −0.027 | −0.029 | 6.9% |

Table 3 illustrates conditions for optimum lift for systems.

| Conditions for optimum lift for systems | $\Delta C_{L\ combination}$ | $\Delta C_{L\ individual\ sum}$ | $\Delta C_{L\ error}$ |
|---|---|---|---|
| ① 20 mm ② 12.7 degrees | −0.160 | −0.156 | 2.5% |
| ① 20 mm, ③ 120 mm, 35 degrees | −0.104 | −0.105 | 0.9% |
| ② 12.7 degrees, ③ 120 mm, 35 degrees | −0.085 | −0.087 | 2.3% |
| ① 20 mm ② 12.7 degrees ③ 120 mm, 35 degrees | −0.174 | −0.174 | 0% |

Table 2 and Table 3 show values obtained by simply summing drag coefficients CD and lift coefficients CL of the devices and drag coefficients CD and lift coefficients CL for combinations of the devices, thereby showing the relationships therebetween. It can be seen from the tests that the aerodynamic relationship between the active rear spoiler 730 and the rear bumper spoiler 750 is the strongest.

Accordingly, as can be seen from the tables, it can be seen the aerodynamic effect of the combination G (①+②+③) is the greatest. Obviously, the optimum values may depend on the type and style of the vehicle, but it was found that the values were improved in order of combinations G>D>E>A>F>C>B.

Referring to FIG. 3, a speed table is stored in advance in the controller 300, and in the present invention, the first range VR1 was defined as the case where the speed of the vehicle is 0~80 km/h, and the normal mode BM is set when the speed of the vehicle is in this range. Further, the second range VR2 was defined as the case where the speed of the vehicle is 80~160 km/h, and the fuel-efficient mode EM is set when the speed of the vehicle is in this range. Further, the third range VR3 is defined as the case where when the speed of the vehicle is 160 km/h or more, and the driving mode DM is set when the speed of the vehicle is in this range. The fuel efficiency can be increased by eliminating factors that interfere with the movement of the vehicle by acting in the direction opposite the movement direction of the vehicle in the fuel-efficient mode EM, so the combination that satisfies the optimum conditions of the drag coefficient CD is used in the fuel-efficient mode DM in the second range VR2. Further, in the driving mode DM, it is important to help the vehicle run, and particularly to prevent the rear of the vehicle from being lifted by lift due to an increase in the speed of the vehicle, so the combination that satisfies the optimum conditions of the lift coefficient CL is used in the driving mode DM. The values and periods described herein are set for convenience and may be freely changed depending on the type or the shape of the vehicle in the design process.

Further, the controller 300 has a first hysteresis period HR1 for stowing the devices that have been deployed of the active air skirt 710, the active rear spoiler 730, and the active rear bumper spoiler 750 at a speed lower than the speed when the second range VR2 was started, when the speed of the vehicle decreases from the second range VR2 inputted in the controller 300 to the first range VR1. Further, the controller 300 has a second hysteresis period HR2 for stowing the devices that have been deployed of the active air skirt 710, the active rear spoiler 730, and the active rear bumper spoiler 750 at a speed lower than the speed when the third range VR2 was started, when the speed of the vehicle decreases from the third range VR3 inputted in the controller 300 to the second range VR2, whereby it is possible to protect the vehicle and increase stability of the vehicle.

Further, according to a variable aerodynamic system for a vehicle of another embodiment of the present invention, a speed table including a normal mode BM, a fuel-efficient mode EM, and a driving mode has been inputted in advance in the controller 300. According to this embodiment, when a sedan in which the height from the end of the front bumper 100 to the front wheel center FC is within a predetermined reference value runs, the controller 300 may receive information about the vehicle obtained by the detector 200, check the mode in the speed table in the controller 300 to which the speed of the vehicle corresponds, and deploy or stow only the active air skirt 710 and the active rear spoiler 730 in accordance with the reference value corresponding to the mode for the current speed of the vehicle.

Next, a case when the vehicle is an SUV is described. When the vehicle is an SUV, as described above, the system can be used only for the case when a spare tire 600 is attached to the bottom of a rear floor 500 of the vehicles, including the conditions for sedans. This is because vortexes are generated around the spare tire 600 and interfere with the running of the vehicle while the vehicle runs.

When determining that the vehicle is an SUV and the speed of the vehicle is in the first range VR1 inputted in the controller 300, the controller 300 determines that the current driving mode of the vehicle is the normal mode BM and does not deploy the active air skirt 710 and the active rear spoiler 730.

Second, when the vehicle is an SUV and it is determined that the speed of the vehicle is in the second range VR2, inputted in the controller 300, the controller 300 determines that the current driving mode of the vehicle is the fuel-efficient mode EM and controls actuators to deploy the active air skirt 710 to an extent corresponding to the third reference value inputted in the controller 300. Accordingly, the active air skirt 710 is deployed 100 mm downward from the vehicle in accordance with the third reference value.

Finally, when it is determined that the vehicle is an SUV and the speed of the vehicle is in the third range VR3, inputted in the controller 300, the controller 300 determines that the current driving mode of the vehicle is the driving mode DM, and controls the actuators to an extent corresponding to the fourth reference value, inputted in the controller 300, to deploy the active air skirt 710 and the active rear spoiler 730. Accordingly, in accordance with the fourth reference value, only the active air skirt 710 is deployed 100 mm downward from the vehicle, or the active air skirt 710 is deployed 100 mm downward from the vehicle and the active spoiler 730 is deployed to an angle δ of 15 degrees from the horizontal line of the vehicle. The deploying angle δ of the active rear spoiler 730 may depend on the operational mechanism structure, and the larger the deploying angle δ of the active rear spoiler 730, the smaller the lift at the rear wheels of the vehicle, so the driving stability is improved.

In particular, as described above, when the vehicle is an SUV, the vehicle may run with the active rear bumper spoiler 750 stowed or deployed, depending on the shape or the driving mode of the vehicle.

As described above, in order for the controller 300 to deploy (draw out) the different aerodynamic devices in the normal mode BM, the fuel-efficient mode EM, and the driving mode DM to a predetermined extent, drag coefficients CD and lift coefficients CL are calculated in advance for the case where the active air skirt 710, the active rear spoiler 730, and the active rear bumper spoiler 750 are deployed, drag coefficients CD and lift coefficients CL are calculated in advance for combinations of two or more of the active air skirt 710, the active rear spoiler 730, and the active rear bumper spoiler 750, and then optimum conditions are obtained through testing.

Table 4 illustrates optimum conditions for combinations (based on analysis result and SUV).

| Combination | | Condition for optimum drag | Condition for optimum lift | $\Delta C_D$ (Drag) | $\Delta C_L$ (Lift) |
|---|---|---|---|---|---|
| A | ① AAS | 100 mm | 100 mm | −0.019 | −0.047 |
| B | ② ARS | 100 mm | 15 degrees | −0.006 | −0.125 |
| C | ③ RBAS | no effect | no effect | no | no |
| D | ① + ② | ① 100 mm | ① 100 mm | −0.019 | −0.156 |
|   |       | ② 0 mm   | ② 15 degrees |   |   |
| E | ① + ③ |  no combination effect |  |  |  |
| F | ② + ③ |   |   |   |   |
| G | ① + ②  + ③ |   |   |   |   |

The table was obtained through test of optimum conditions for devices based on an SUV. As can be seen from Table 4, even for the drag coefficients CD and the lift coefficients of the same devices, different conditions were obtained for each combination. In particular, unlike a sedan described above, it was found that there is no effect in the combination of other aerodynamic devices and the active rear bumper spoiler 750, so control is performed except the active rear bumper spoiler 750 in SUVs.

Table 5 illustrates conditions for optimum drag for systems.

| Conditions for optimum drag for systems | $\Delta C_{D\ combination}$ | $\Delta C_{D\ individual\ sum}$ | $\Delta C_{D\ error}$ |
|---|---|---|---|
| ① 100 mm, ② 100 mm | −0.019 | −0.025 | 24% |
| ① 100 mm, ③ no condition | | no combination effect | |
| ② 100 mm, ③ no condition | | | |
| ① 100 mm, ② 100 mm, ③ no condition | | | |

Table 6 illustrates conditions for optimum lift for systems.

| Conditions for optimum lift for systems | $\Delta C_{L\ combination}$ | $\Delta C_{L\ individual\ sum}$ | $\Delta C_{L\ error}$ |
|---|---|---|---|
| ① 100 mm, ② 15 degrees | −0.156 | −0.172 | 9.3% |
| ① 100 mm, ③ no condition | | no combination effect | |
| ② 15 degrees, ③ no condition | | | |
| ① 100 mm, ② 15 degrees, ③ no effect | | | |

Table 5 and Table 6 show values obtained by simply summing drag coefficients CD and lift coefficients CL of the devices and drag coefficients CD and lift coefficients CL for combinations of the devices, proving that they have relationships. It can be seen from the tests that the aerodynamic relationship between the active air skirt 710 and the active rear spoiler 730 is largest.

Accordingly, as can be seen from the tables, it can be seen that the aerodynamic effect of the combination D (①+②) is the greatest. Obviously, the optimum values may depend on the type and style of the vehicle, but it was found that drag was reduced in the order of combinations A,D>B and lift was reduced in the order of combinations D>B>A.

Similar to the case of a sedan, referring to FIG. 3, a speed table is stored in advance in the controller 300, and in the present invention, the first range VR1 is defined as the case where the speed of a vehicle is 0~80 km/h, and the normal mode BM is set when the speed of a vehicle is in this range. Further, the second range VR2 is defined as the case where the speed of the vehicle is 80~160 km/h, and the fuel-efficient mode EM is set when the speed of the vehicle is in this range. Further, the third range VR3 is defined as the case where the speed of the vehicle is 160 km/h or more, and the driving mode DM is defined as the case where the speed of the vehicle is in this range. Fuel efficiency can be increased by removing factors that interfere with the movement of the vehicle by acting in the direction opposite the direction of movement of the vehicle in the fuel-efficient mode EM, so the combination that satisfies the optimum conditions of the drag coefficient CD is used in the fuel-efficient mode DM in the second range VR2. Further, in the driving mode DM, it is important to help the vehicle run, and particularly to prevent the rear of the vehicle from being lifted by lift due to an increase in the speed of the vehicle, so the combination that satisfies the optimum conditions of the lift coefficient CL is used in the driving mode DM. The values and sections described herein are set for convenience and may be freely changed depending on the type or the shape of the vehicle in the design process.

Further, the controller 300 has a first hysteresis period HR1 for stowing the devices that have been deployed, among the active air skirt 710, the active rear spoiler 730, and the active rear bumper spoiler 750, at a speed lower than the lower speed limit of the second range VR2, when the speed of the vehicle decreases from the second range VR2, inputted in the controller 300, to the first range VR1. Further, the controller 300 has a second hysteresis period HR2 for stowing the devices that have been deployed, among the active air skirt 710, the active rear spoiler 730, and the active rear bumper spoiler 750, at a speed lower than the speed at which the third range VR2 was started, when the speed of the vehicle decreases from the third range VR3, inputted in the controller 300, to the second range VR2, whereby it is possible to protect the vehicle and increase the stability of the vehicle.

The variable aerodynamic system for a vehicle of the present invention can perform specific control when the basic information of a vehicle inputted in advance in the controller 300 by the detector 200 and the vehicle speed inputted in the controller 300 correspond to the fuel-efficient mode EM, regardless of the types of vehicles. The basic information of a vehicle may be the characteristics, manufacturing cost, and weight of the vehicle. That is, a speed table including a normal mode BM, a fuel-efficient mode, and a driving mode based on the basic information and the speed of a vehicle has been inputted in advance in the controller 300. According to this embodiment, when a vehicle in which the height from the end of the front bumper 100 to the front wheel center FC is within a predetermined reference value runs, the controller 300 may receive information about the vehicle obtained by the detector 200, and when the speed of the vehicle corresponds to the fuel-efficient mode EM in the speed table in the controller 300, the controller 300 may deploy or stow only the active air skirt 710 and the active rear spoiler 730, which are deployed in accordance with the reference value corresponding to the fuel-efficient mode EM, regardless of the type of the vehicle.

Therefore, according to the variable aerodynamic system for a vehicle of the present invention, when the active air skirt 710, the active rear spoiler 730, and the active rear bumper spoiler 750 are mounted on a vehicle, one or more of the aerodynamic devices are simultaneously deployed, so it is possible to improve fuel efficiency and secure driving stability by applying the optimum drag coefficient CD or lift coefficient CL to driving of the vehicle in accordance with the ranges of speed of the vehicle.

As would be obvious a person having ordinary skill in the art, the controller described above in various embodiments may be configured or caused to perform the functions using software or hardware based techniques.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A variable aerodynamic system for a vehicle, the system comprising:
    an active air skirt;
    an active rear spoiler;
    an active rear bumper spoiler, wherein a height from an end of a front bumper to a front wheel center is within a predetermined value; and
    a controller configured to
        select and deploy one or more of the active air skirt, the active rear spoiler, and the active rear bumper spoiler while the vehicle is running upon
            receiving information obtained by a detector, and
            determining that the obtained information satisfies conditions inputted in advance by comparing the obtained information with the conditions inputted in advance,
    wherein a speed table including a normal mode, a fuel-efficient mode, and a driving mode divided in accordance with a speed of a vehicle is inputted in the controller, the normal mode, the fuel-efficient mode, and the driving mode being set to have a first range, a second range and a third range, respectively, and the controller is configured to
        check a mode in the speed table to which a current speed inputted by the detector corresponds, and
        select and deploy one or more of the active air skirt, the active rear spoiler, and the active rear bumper spoiler in accordance with the mode to which the current speed of the vehicle corresponds,
    wherein the controller has a first hysteresis period for stowing devices that have been deployed of the active air skirt, the active rear spoiler, and the active rear bumper spoiler at a speed lower than a speed when the second range was started, when the speed of the vehicle decreases from the second range inputted in the controller to the first range,
    wherein the controller has a second hysteresis period for stowing devices that have been deployed of the active air skirt, the active rear spoiler, and the active rear bumper spoiler at a speed lower than a speed when the third range was started, when the speed of the vehicle decreases from the third range inputted in the controller to the second range.

2. The system of claim 1, wherein when the vehicle is a sedan and the speed of the vehicle is within the first range inputted in advance in the controller, the controller determines that it is the normal mode and does not deploy the active air skirt, the active rear spoiler, and the active rear bumper spoiler.

3. The system of claim 1, wherein when the vehicle is a sedan and the speed of the vehicle is within the second range inputted in advance in the controller, the controller determines that it is the fuel-efficient mode and deploys the active air skirt, the active rear spoiler, and the active rear bumper spoiler to an extent corresponding to a first reference value inputted in advance in the controller.

4. The system of claim 1, wherein when the vehicle is a sedan and the speed of the vehicle is within the third range inputted in advance in the controller, the controller determines that it is the driving mode and deploys the active air skirt, the active rear spoiler, and the active rear bumper spoiler to an extent corresponding to a second reference value inputted in advance in the controller.

5. The system of claim 1, wherein when the vehicle is a sports utility vehicle (SUV) and the speed of the vehicle is within the first range inputted in advance in the controller, the controller determines that it is the normal mode and does not deploy the active air skirt and the active rear spoiler.

6. The system of claim 1, wherein when the vehicle is an SUV and the speed of the vehicle is within the second range inputted in advance in the controller, the controller determines that it is the fuel-efficient mode and deploys the active air skirt to an extent corresponding to a third reference value inputted in advance in the controller.

7. The system of claim 1, wherein when the vehicle is an SUV and the speed of the vehicle is within the third range inputted in advance in the controller, the controller determines that it is the driving mode and deploys the active air skirt and the active rear spoiler as much as a fourth reference value inputted in advance in the controller.

8. The system of claim 1, wherein a height from an end of a rear bumper to a rear wheel center of a vehicle is within a predetermined reference value.

9. The system of claim 1, wherein the system is applied, when the vehicle is an SUV and a spare tire is attached to a bottom of a rear floor.

10. A variable aerodynamic system for a vehicle, wherein a speed table including a normal mode, a fuel-efficient mode, and a driving mode divided in accordance with a speed of a vehicle is inputted in a controller, the normal mode, the fuel-efficient mode, and the driving mode being set to have a first range, a second range and a third range, respectively, and
    the system comprises an active air skirt and an active rear spoiler that are deployed by a controller in accordance with a reference value corresponding to a mode in which a current speed of the vehicle is included, after the controller receives information obtained by a detector and checks a mode in the speed table in the controller to which the speed of the vehicle corresponds, while the vehicle, in which a height from an end of a front bumper to a front wheel center is within a predetermined value, runs, wherein the controller has a first hysteresis period for stowing devices that have been deployed of the active skirt and the active rear spoiler at a speed lower than a speed when the second range was started, when the speed of the vehicle decreases from the second range inputted in the controller to the first range, wherein the controller has a second hysteresis period for stowing devices that have been deployed of the active air skirt and the active rear spoiler at a speed lower than a speed when the third range was started, when the speed of the vehicle decreases from the third range inputted in the controller to the second range.

11. A variable aerodynamic system for a vehicle comprising:
    a controller having access to a speed table including a normal mode, a fuel-efficient mode, and a driving mode, the normal mode, the fuel-efficient mode, and the driving mode being set to have a first range, a second range and a third range, respectively;
    an active air skirt; and
    an active rear spoiler, wherein, while the vehicle in operational, the controller is configured to deploy the active air skirt and the active rear spoiler in accordance with a reference value corresponding to the fuel-efficient mode when the controller receives information about the vehicle from a detector, and a speed of the vehicle corresponds to the fuel-efficient mode in the speed table, wherein a height from an end of a front bumper to a front wheel center is within a predetermined value, wherein the controller has a first hysteresis period for stowing devices that have been deployed of the active air skirt and the active rear spoiler at a speed lower than a speed when the second range was started, when the speed of the vehicle decreases from the second range inputted in the controller to the first range, wherein the controller has a second hysteresis period for stowing devices that have been deployed of the active air skirt and the active rear spoiler at a speed lower than a speed when the third range was started, when the speed of the vehicle decreases from the third range inputted in the controller to the second range.

12. A method of operating a vehicle comprising a variable aerodynamic system, the method comprising:

detecting a speed of the vehicle;

having access to a speed table comprising a plurality of operational modes including a normal mode, a fuel-efficient mode, and a driving mode, the normal mode, the fuel-efficient mode, and the driving mode being set to have a first range, a second range and a third range, respectively;

based on the detected speed, selecting an operational mode of the plurality of operational modes; and deploying an active air skirt, an active rear spoiler, and/or an active rear bumper spoiler in accordance with a reference value corresponding to selected operational mode of the plurality of operational modes, wherein a controller in the vehicle has a first hysteresis period for stowing devices that have been deployed of the active air skirt, the active rear spoiler, and the active rear bumper spoiler at a speed lower than a speed when the second range was started, when the speed of the vehicle decreases from the second range inputted in the controller to the first range, wherein the controller has a second hysteresis period for stowing devices that have been deployed of the active air skirt, the active rear spoiler, and the active rear bumper spoiler at a speed lower than a speed when the third range was started, when the speed of the vehicle decreases from the third range inputted in the controller to the second range.

13. The method of claim 12, wherein a height from an end of a front bumper to a front wheel center is within a predetermined value.

14. The method of claim 12, further comprising when the vehicle is a sedan and the speed of the vehicle is within the first range inputted in advance, selecting the normal mode from the plurality of operational modes, and not deploying the active air skirt, the active rear spoiler, and the active rear bumper spoiler.

15. The method of claim 12, wherein when the vehicle is a sedan and the speed of the vehicle is within the second range inputted in advance, selecting the fuel-efficient mode from the plurality of operational modes, and deploying the active air skirt, the active rear spoiler, and the active rear bumper spoiler to an extent corresponding to a first reference value inputted in advance.

16. The method of claim 12, wherein when the vehicle is a sedan and the speed of the vehicle is within the third range inputted in advance, selecting the driving mode from the plurality of operational modes, and deploying the active air skirt, the active rear spoiler, and the active rear bumper spoiler to an extent corresponding to a second reference value inputted in advance.

17. The method of claim 12, further comprising when the vehicle is a sports utility vehicle (SUV) and the speed of the vehicle is within the first range inputted in advance, selecting the normal mode from the plurality of operational modes, and not deploying the active air skirt, and the active rear spoiler.

* * * * *